US012110718B2

(12) United States Patent
Graute et al.

(10) Patent No.: US 12,110,718 B2
(45) Date of Patent: Oct. 8, 2024

(54) MOTOR VEHICLE LOCK

(71) Applicant: Brose Schließsysteme Gmbh & Co. Kommanditgesellschaft, Wuppertal (DE)

(72) Inventors: Ludger Graute, Essen (DE); Roman Joschko, Dormagen (DE); Thomas Klemmstein, Mönchengladbach (DE)

(73) Assignee: Brose Schließsysteme Gmbh & Co. Kommanditgesellschaft (DE)

( * ) Notice: Subject to any disclaimer, the term of this patent is extended or adjusted under 35 U.S.C. 154(b) by 243 days.

(21) Appl. No.: 17/622,295

(22) PCT Filed: Jun. 24, 2020

(86) PCT No.: PCT/EP2020/067639

§ 371 (c)(1),
(2) Date: Dec. 23, 2021

(87) PCT Pub. No.: WO2020/260359

PCT Pub. Date: Dec. 30, 2020

(65) Prior Publication Data

US 2022/0259898 A1 Aug. 18, 2022

(30) Foreign Application Priority Data

Jun. 28, 2019 (DE) ..................... 10 2019 117 557.7

(51) Int. Cl.
*E05B 81/20* (2014.01)
*E05B 81/14* (2014.01)
(Continued)

(52) U.S. Cl.
CPC .............. *E05B 81/20* (2013.01); *E05B 81/14* (2013.01); *E05B 83/36* (2013.01); *E05B 85/26* (2013.01)

(58) Field of Classification Search
CPC .......... E05B 81/00; E05B 81/12; E05B 81/14; E05B 81/20; E05B 81/21; E05B 81/22;
(Continued)

(56) References Cited

U.S. PATENT DOCUMENTS

2007/0205613 A1* 9/2007 Berghahn ................ E05B 81/20 292/216
2008/0294314 A1* 11/2008 Morris ...................... E05F 5/00 701/49
2016/0108647 A1* 4/2016 Scholz .................... E05B 79/10 292/195

FOREIGN PATENT DOCUMENTS

DE 102008048772 A1 3/2010
DE 102008048773 A1 * 3/2010 ............ E05B 81/14
(Continued)

*Primary Examiner* — Nathan Cumar
(74) *Attorney, Agent, or Firm* — Dickinson Wright PLLC

(57) ABSTRACT

A motor vehicle lock including a latch and a pawl assembly associated with the latch including a pawl, the pawl assembly, in a blocking state, blocks the lock latch in a locking position, and a trigger assembly; the trigger assembly configured to actuate the pawl assembly out of the blocking state during an opening process; and a draw-in assembly including a coupling lever pivotable to a coupling position, for coupling to the lock latch to lock the lock latch. The closing assembly including an ejector lever including an ejector contour for ejecting the coupling lever, in an ejection position, out of engagement from the pawl, and a trigger section, in an emergency actuation, configured to engage the ejector lever via at least part of the closing process to eject the coupling lever and disengaged from the ejector lever during at least part of the opening process.

17 Claims, 6 Drawing Sheets

(51) Int. Cl.
*E05B 83/36* (2014.01)
*E05B 85/26* (2014.01)

(58) Field of Classification Search
CPC ........ E05B 83/00; E05B 83/36; E05B 83/363; E05B 83/367; E05B 85/00; E05B 85/20; E05B 85/24; E05B 85/26
USPC ....................................... 292/201, 92, 93, 94
See application file for complete search history.

(56) References Cited

FOREIGN PATENT DOCUMENTS

| | | | |
|---|---|---|---|
| DE | 202008015789 | U1 | 4/2010 |
| DE | 102011012650 | A1 | 8/2012 |
| WO | 2006021253 | A1 | 3/2006 |

* cited by examiner

MOTOR VEHICLE LOCK

CROSS-REFERENCE TO RELATED APPLICATIONS

This application is the U.S. National Phase of PCT Application No. PCT/EP2020/067639 filed on Jun. 24, 2020, which claims priority to German Patent Application No. DE 10 2019 117 557.7, filed on Jun. 28, 2019, the disclosures of which are hereby incorporated in their entirety by reference herein.

TECHNICAL FIELD

The present disclosure relates to a motor vehicle lock having a lock latch and a pawl assembly.

BACKGROUND

Motor vehicle locks may be used in any closure element of a motor vehicle. To this extent, the term "closure element" should be interpreted broadly. It comprises, for example, a side door, a rear door, a tailgate, a trunk lid, a front hood, an engine hood or the like. The closure element can be coupled to the body of the motor vehicle in the manner of a pivoting door or in the manner of a sliding door.

A comfort function of a motor vehicle lock may be referred to as the "closing function", for the use of which the motor vehicle lock is equipped with a closing assembly. The closing function includes motorized adjustment of the closure element from a pre-locking position to a main locking position, and therefore the vehicle operator is released from said final adjustment portion which conventionally has to take place counter to high door sealing pressures.

SUMMARY

The present disclosure attempts to address one or more problems of refining and developing a known motor vehicle lock to such an extent that a reduction in the actuating forces is made possible.

The motor vehicle lock may include a lock latch and a pawl assembly which is assigned to the lock latch and has at least one pawl. The pawl assembly here, in a blocking state, blocks the lock latch in a main locking position and optionally also a pre-locking position lying between an open position of the lock latch and the main locking position of the lock latch.

According to one or more embodiments, a triggering train that may include the pawl assembly and a triggering assembly is provided, and the triggering assembly is configured to actuate the pawl assembly, such as to raise the pawl, out of the blocking state within the scope of an opening operation. The triggering train may form the entire force action chain from a motorized or manual drive as far as the pawl assembly, and the pawl assembly itself is assigned to the triggering train.

The motor vehicle lock may include a closing assembly having a coupling lever, which is pivotable into a coupling position, for coupling to the lock latch in order to close the lock latch in a closing operation. According to the proposal, the closing function corresponds to a motorized adjustment of the lock latch in the locking direction, preferably from the pre-locking position into the main locking position, such as into an overtravel position placed on the far side of the main locking position.

The solution according to the proposal is based on the fundamental consideration of providing a particular type of emergency actuation within the scope of the closing operation via an ejector lever, the emergency actuation not having an obstructive effect on the remaining lock functions, in particular on the opening operation. This is achieved by a targeted interaction between the triggering train and the ejector lever, in particular by the triggering train being disengaged from the ejector lever at least over part of the opening operation.

In detail, it is proposed that the closing assembly has an ejector lever with an ejector contour for ejecting the coupling lever into an ejector position disengaged from the lock latch, and in that the triggering train, in an emergency actuation, can be brought into engagement with the ejector lever over at least part of the closing operation for ejecting the coupling lever and is disengaged from the ejector lever over at least part of the opening operation.

With the solution according to the proposal, at least part of the opening operation, such as the entire opening operation, is mechanically decoupled from the ejector lever, and therefore there is no feedback, increasing the actuating forces, from the ejector lever to the motor vehicle lock. The result is a reduction of actuating forces without complicated design measures having to be taken for this purpose.

With the solution according to the proposal, it is basically possible, in view of optimized actuating forces, to use less powerful and therefore more cost-effective electric motors, especially for the motorized opening operation, without a reduction in operational reliability having to be accepted.

In one or more embodiments, the actuating forces required for the closing operation can also be reduced by the triggering train remaining disengaged from the ejector lever if no emergency actuation is undertaken.

In one or more embodiments, an engagement between the triggering train and the ejector lever is provided exclusively for the emergency actuation within the scope of the closing operation, and that the triggering train is otherwise always disengaged from the ejector lever. The advantages according to the proposal relating to the reduction of actuating forces can therefore be fully utilized.

As an example, the ejector lever can be adjusted between an ejector position and a coupling position, which is associated there with a corresponding adjustment of the coupling lever. The coupling position of the ejector lever could also be referred to as an "activation position" since only when an ejector lever is activated in such a manner is an ejection of the coupling lever by an above emergency actuation possible.

In one or more embodiments, adjustment of the closing lever from its starting position thus permits the initiation of a closing movement in the lock latch via the coupling lever if the coupling lever is in its coupling position. The coupling lever may be arranged eccentrically with respect to the pivot axis of the closing lever.

In another embodiment, the coupling lever is spring-preloaded into its coupling position, and therefore the ejector contour can be used in order to eject the coupling lever counter to its preloading. The coupling function realized by the coupling lever can thus be constructively used in a relatively simple manner.

In one or more embodiments, the ejector lever comes into the movement range of the triggering train only within the scope of the closing operation, and therefore the possibility of the emergency actuation by means of the triggering train arises only within the scope of the closing operation. After completing the closing operation, the ejector lever again leaves the movement range of the triggering train such that an undesirable reaction of the ejector lever on the triggering train is eliminated as discussed above.

In yet another embodiment, in addition to the pawl—first pawl—a second pawl is provided, said pawls interacting with each other in a blocking manner. Such a pawl assembly when suitably designed already leads by itself to relatively low actuating forces within the scope of the motorized opening operation. The further capability of reducing the actuating forces by means of the solution according to the proposal is of very particular importance here.

For the motorized opening operation, the triggering train may be equipped with an opening drive, as proposed provided herein. Alternatively or additionally, the triggering train permits a manual opening operation. In both cases, the reduction of actuating forces within the scope of the opening operation plays an important role.

A reduction in the structural complexity may be produced for the emergency actuation and the pawl of the pawl assembly itself can be brought into engagement with the ejector lever. The resulting small number of levers is associated with a corresponding reduction in the outlay on production for the motor vehicle lock according to the proposal.

In one or more embodiments, a resetting contour is provided which ensures that the coupling lever is in its ejector position when the closing lever is not actuated, and therefore the lock latch can pivot into its open position without being affected by the coupling lever. The resetting contour may be arranged on a housing part of the motor vehicle lock, in particular in the region of a catch bearing of the motor vehicle lock.

BRIEF DESCRIPTION OF THE DRAWINGS

The invention will be explained in more detail below with reference to a drawing illustrating just one exemplary embodiment. In the drawing

DETAILED DESCRIPTION

Figure 1:
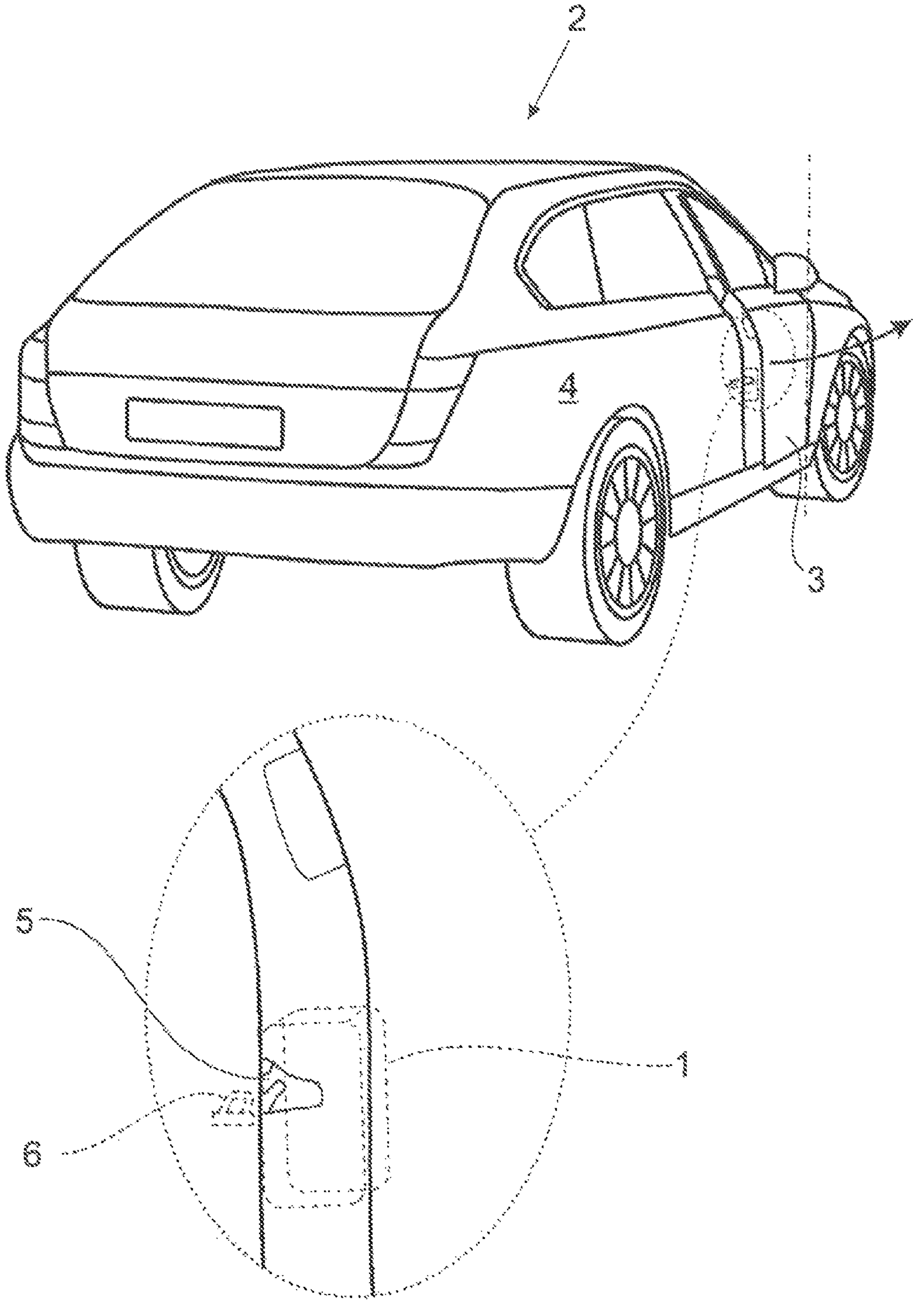
FIG. 1 shows a motor vehicle with a motor vehicle lock according to the proposal.
Figure 2:
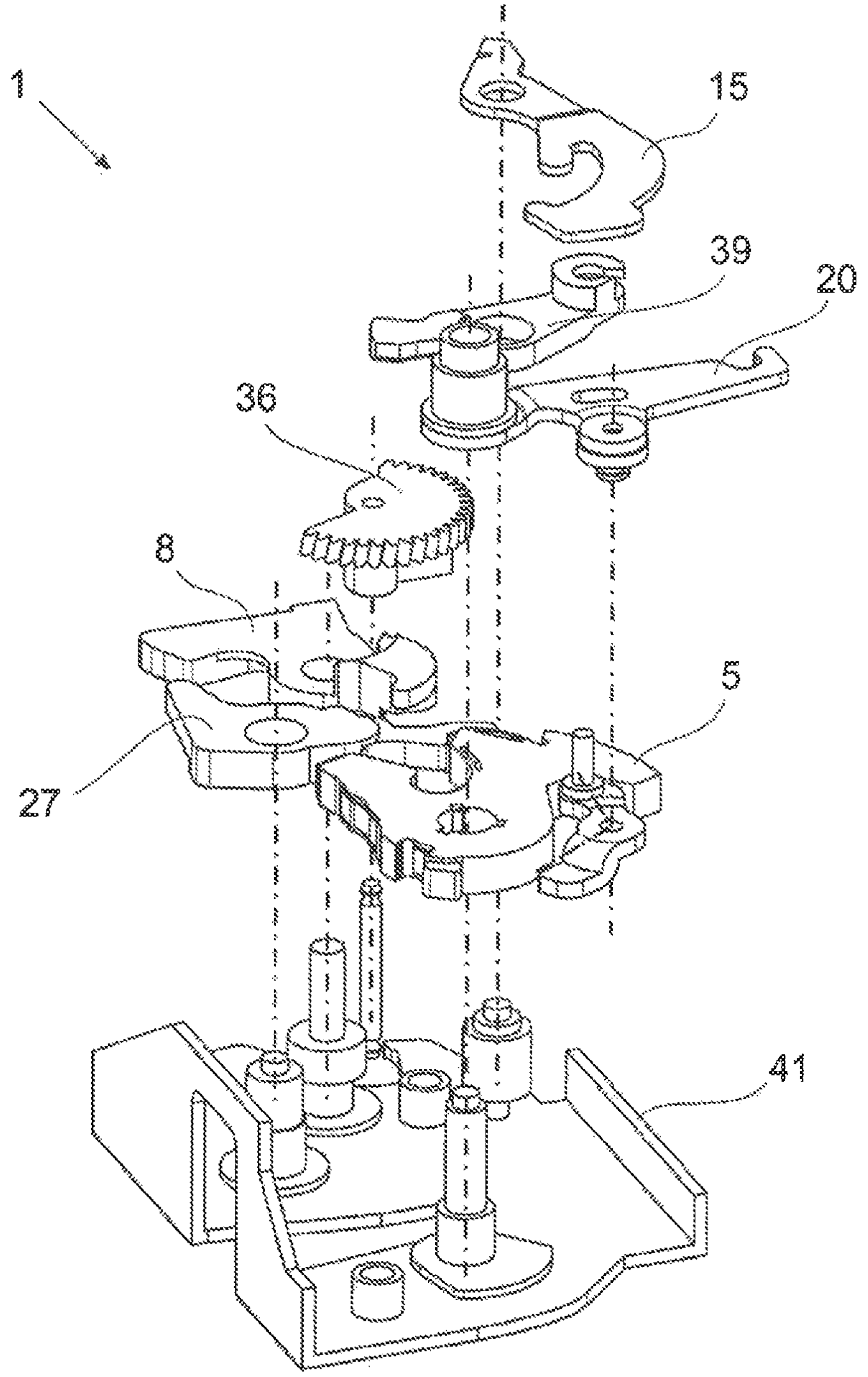
FIG. 2 shows the motor vehicle lock according to FIG. 1 in an exploded illustration.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known motor vehicle lock is provided in DE 10 2008 048 772 A1 and includes conventional locking elements of "lock latch" and "pawl". To open the motor vehicle lock, a triggering assembly is provided which is configured for raising the pawl. In order to realize the closing function, a closing assembly is provided with a coupling lever which, in a coupling position, is coupled in terms of drive to the lock latch. The triggering assembly, there a triggering lever of the triggering assembly, is designed in such a manner that an emergency actuation during the closing operation leads to ejection of the coupling lever. One disadvantage here is that, with the known motor vehicle lock, an adverse effect on the opening operation by the closing assembly cannot be eliminated insofar as the actuating forces which are involved are concerned. Added to this is the fact that the coupling between the triggering assembly and the closing assembly means that increased actuating forces have to be expected during the closing operation.

The motor vehicle lock 1 according to the proposal and illustrated in the drawing can be assigned to any closure element of a motor vehicle 2. In respect of further understanding of the term "closure element", reference should be made to the introductory part of the description. In the exemplary embodiment illustrated, the closure element is a side door 3 of the motor vehicle 2. All statements in this regard apply correspondingly to all other types of closure elements.

Figure 5:
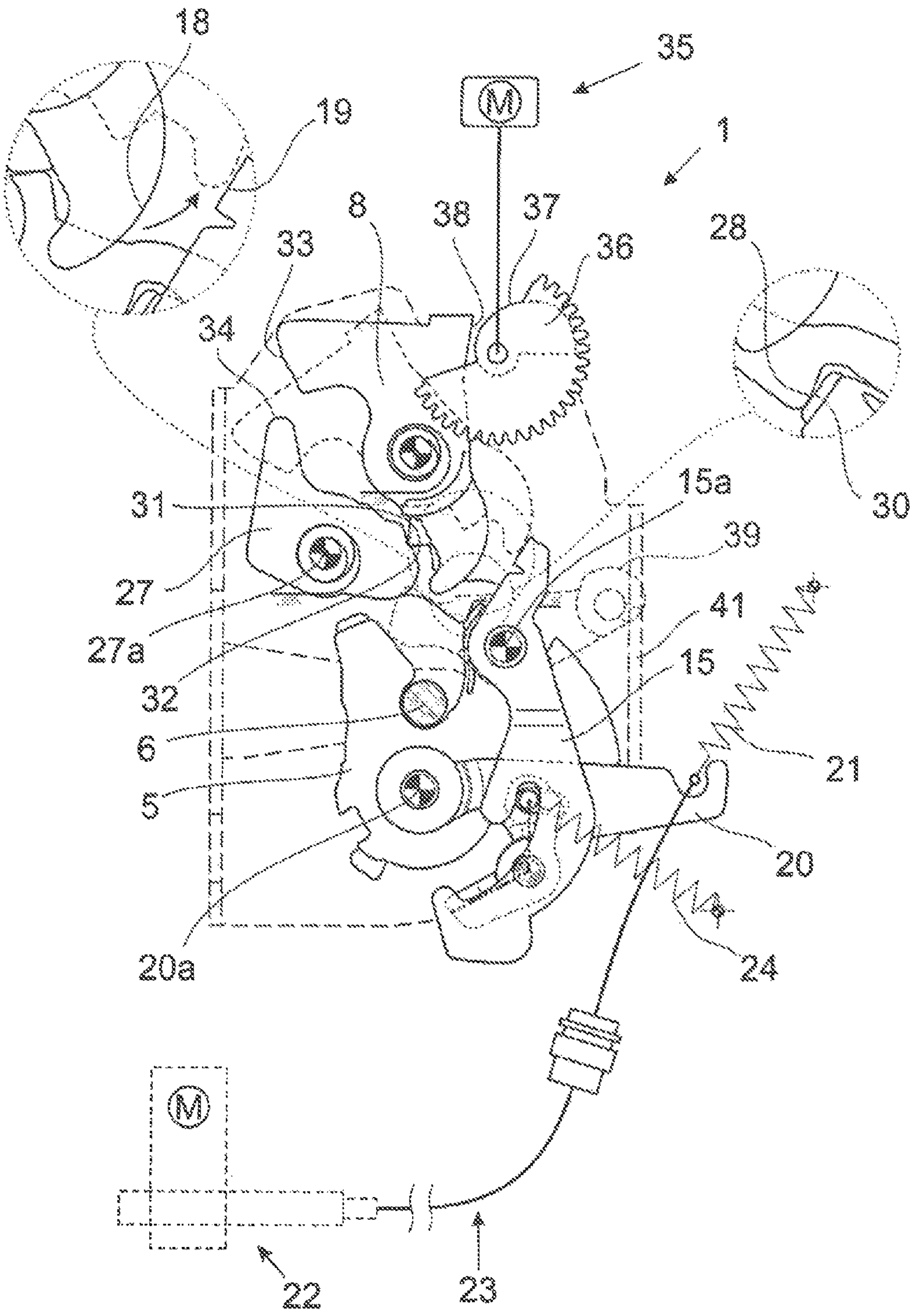
FIG. 5 shows the motor vehicle lock according to FIG. 2 with the lock latch in the main locking position.

In order to produce a holding effect between the side door 3 and the body 4 of the motor vehicle 2, the motor vehicle lock 1 is equipped with a lock latch 5 which is pivotable about a lock latch axis 5*a* into an open position (FIG. 6), into a pre-locking position (FIG. 3) and into a main locking position (FIG. 5). The lock latch 5 interacts in a conventional manner per se with a locking part 6, such as in the form of a striker, in order to hold the side door 3 in its respective locking position. In this case, the lock latch 5 is arranged on the side door 3 while the locking part 6 is arranged on the motor vehicle body 4. This may also be provided the other way around.

In order to realize the above holding effect, it is furthermore provided that the lock latch 5 is assigned a pawl assembly 7. The pawl assembly 7 has at least one pawl 8. As is also explained, the pawl assembly 7 can have a further pawl. The pawl 8 is therefore referred to here as "first pawl 8".

In the present case, the pawl assembly 7 is configured as a two pawl system, as indicated above. However, the explanation of the teaching according to the proposal first of all starts from the one first pawl 8 which, for its part, is pivotable about a pawl axis 8*a*. The function of the pawl assembly 7 consists, in a manner yet to be explained, in blocking the lock latch 5 in the main locking position (FIG. 5) and in the pre-locking position (FIG. 3) in a blocking state of the motor vehicle lock 1. As an example, it is also possible for only the main locking position blocked by the pawl assembly 7, and not a pre-locking position, to be provided for the lock latch 5.

According to the proposal, the motor vehicle lock 1 is assigned a triggering train 9 which consists on the one hand of the pawl assembly 7 and on the other hand of a triggering assembly 10. The triggering assembly 10 is configured here to actuate the pawl assembly 7, such as to raise the first pawl 8, out of the blocking state within the scope of an opening operation. The raising of the first pawl 8 within the scope of the opening operation corresponds in the drawing to a pivoting of the first pawl 8 counterclockwise.

The motor vehicle lock 1 according to the proposal is configured both for the motorized opening operation and for the manual opening operation. This will also be explained further below.

In order to realize an above-discussed closing function, the motor vehicle lock 1 has a closing assembly 11 with a coupling lever 12, which is pivotable about a coupling lever axis 12*a* into a coupling position (FIG. 4), for coupling to the lock latch 5 in order to close the lock latch 5 in a closing operation. In the drawing, the closing operation is associated with pivoting of the lock latch 5 in the clockwise direction. For this purpose, the coupling lever 12 has an engagement arm 13 which interacts with an engagement contour 14 on the lock latch 5 within the scope of the closing operation. The coupling lever 12 can also be pivoted into an ejector position (FIGS. 3, 5, 6) in which the coupling lever 12 is disengaged from the engagement contour 14 of the lock latch 5.

It is now essential that the closing assembly 11 has an ejector lever 15 with an ejector contour 16 for ejecting the coupling lever 12 into the ejector position disengaged from the lock latch 5. For the interaction with the ejector lever 15, the coupling lever 12 has a control arm 17.

Figure 6:
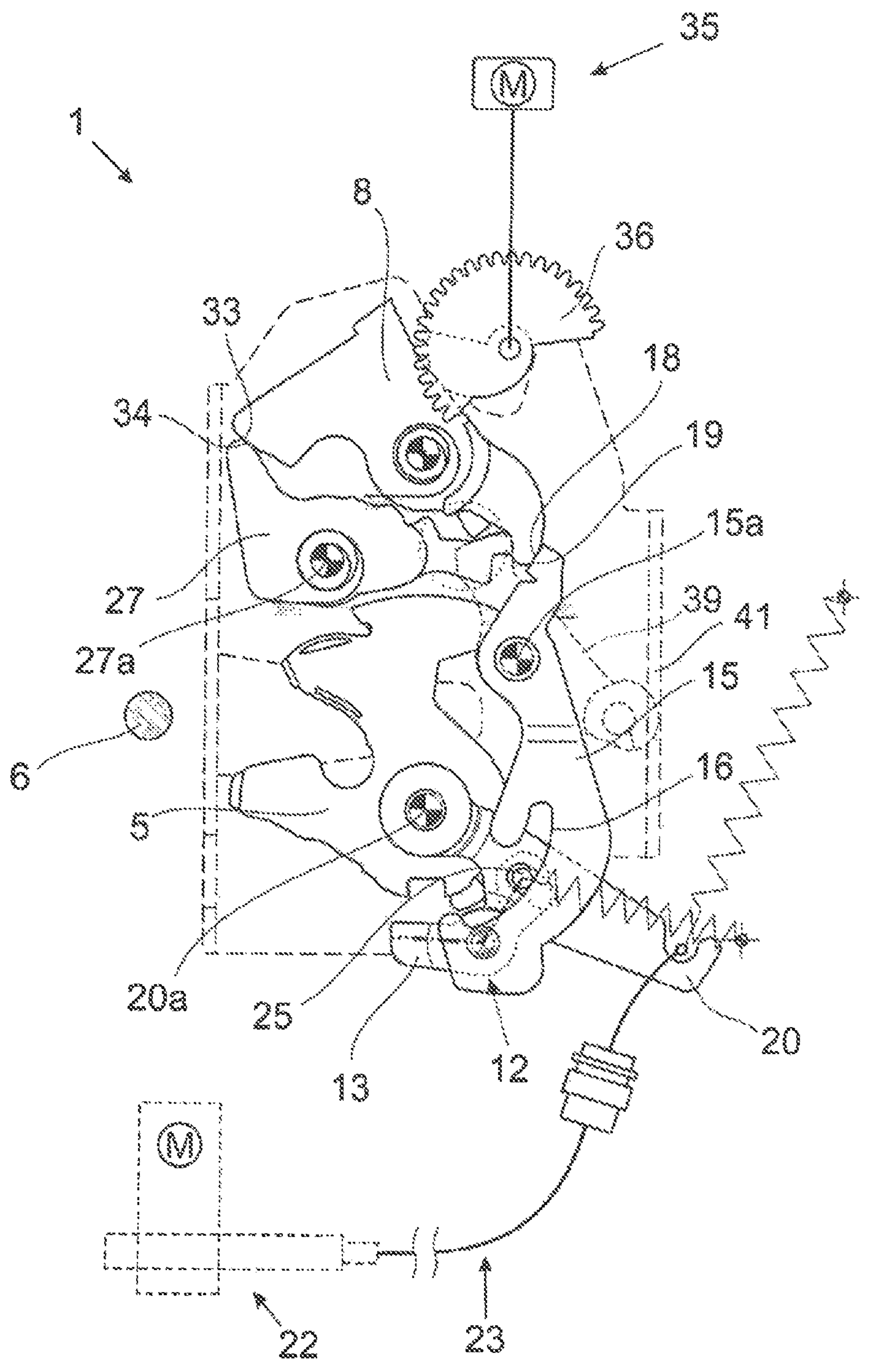
FIG. 6 shows the motor vehicle lock according to FIG. 2 during an emergency actuation within the scope of the closing operation.

FIG. 6 shows that the triggering train 9, here the first pawl 8, in an emergency actuation, can be brought into engagement with the ejector lever 15 over at least part of the closing operation for ejecting the coupling lever 12. In detail, the first pawl 8 for this purpose has an emergency actuating arm 18 which interacts with an activation arm 19 of the ejector lever 15 for the emergency actuation. In the drawing, the emergency actuation is associated with a pivoting of the ejector lever 15 about its ejector lever axis 15*a* in the clockwise direction. As an example, the emergency actuation can also be brought about by the engagement of other components of the triggering train 9, for example an actuating lever for the manual opening operation, with the ejector lever 15.

The opening operation both from the pre-locking position and from the main locking position is associated with raising of the first pawl 8. In the exemplary embodiment which is illustrated, corresponds to a pivoting of the first pawl 8 in the counterclockwise direction. It can be gathered from the drawing that the opening operation neither from the pre-locking position (FIG. 3) nor from the main locking position (FIG. 5) is associated with an engagement between the emergency actuating arm 18 of the first pawl 8 and the activation arm 19 of the ejector lever 15. It is therefore very generally the case that the triggering train 9 is disengaged from the ejector lever 15 over at least part of the opening operation, preferably over the entire opening operation. To this extent, the ejector lever 15 in no way impairs the opening operation, whether it is motorized or manual. As a result, the opening operation is unencumbered by the ejector lever 15, which in principle leads to a cost-effective design of the motor vehicle lock 1 at least insofar as the motorized opening operation is concerned.

Furthermore, in the exemplary embodiment which is illustrated, it is the case that, within the scope of the closing operation without an emergency actuation, the triggering train 9 is disengaged from the ejector lever 15. This is apparent from the sequence of FIG. 3 and FIG. 4. Therefore, conversely, the closing operation is also unencumbered by the triggering train 9, which permits a cost-effective design of the components involved in the closing operation.

Very generally, in one or more embodiments, the triggering train 9, in the emergency actuation, can be brought into engagement with the ejector lever 15 over at least part of the closing operation in order to eject the coupling lever 12, wherein the triggering train 9 is otherwise always disengaged from the ejector lever 15. This means that an engagement between the triggering train 9 and the ejector lever 15 is provided exclusively for the emergency actuation, and therefore otherwise there is no interaction between triggering train 9 and ejector lever 15.

The ejector lever 15 may be adjustable between an ejector position (FIGS. 3, 5, 6) and a coupling position (FIG. 4), wherein the ejector lever 15 interacts with the control arm 17 of the coupling lever 12 in such a manner that an adjustment of the ejector lever 15 between its ejector position and its coupling position is associated with a corresponding adjustment of the coupling lever 12, namely between its ejector position and its coupling position.

The mechanism of the closing assembly 11 that is illustrated may be completed by the closing assembly 11 having a closing lever 20 which is pivotable about a closing lever axis 20*a* and is mounted on the coupling lever 12 so as to be pivotable about the coupling lever axis 12*a*. The closing operation is associated with a closing adjustment of the closing lever 20 from a starting position (FIGS. 3, 5) into a closing position (FIG. 4). After completing the closing operation, a preferably spring-based resetting of the closing lever 20 into its starting position takes place. For this purpose, the closing lever 20 is spring-preloaded into its starting position by the spring assembly 21.

The coupling lever axis 12*a* of the coupling lever 12 is spaced apart such as from the closing lever axis 20*a* of the closing lever 20, with the coupling lever axis 12*a* and the closing lever axis 20*a* being oriented parallel to each other. The same is true of the ejector lever axis 15*a* which is spaced apart from the coupling lever axis 12*a* and from the closing lever axis 20*a* and is parallel to the two axes 12*a*, 20*a* mentioned.

The closing lever 20 may be coupled to an external closing drive 22 via a Bowden cable 23. As an example, it can also be provided that the closing drive 22 is integrated in the motor vehicle lock 1. The specific configuration of the closing drive 22 plays only an insubordinate role for the solution according to the proposal.

The coupling lever 12 may be spring-preloaded into its coupling position by a spring assembly 24, specifically in such a manner that the coupling lever 12 would always be in its coupling position without the ejector lever 15. The ejector lever 15 may be spring-preloaded into its ejector position, in the clockwise direction in FIG. 5, by a spring assembly, not illustrated here.

As an example, it is furthermore provided that, within the scope of the closing operation without an emergency actuation, the ejector lever 15 is adjusted from its ejector position (FIG. 3), in which the ejector lever 15 is outside the movement range of the triggering train 9, into its coupling position, in which the ejector lever 15 is within the movement range of the triggering train 9. The movement range of the triggering train 9 may be the movement range of the first pawl 8 since only the first pawl 8 can be brought into interaction with the activation arm 19 of the ejector lever 15. As a result of the fact that the ejector lever 15, as an example, the activation arm 19 of the ejector lever 15, passes within the scope of the closing operation into the movement range of the triggering train 9, here the first pawl 8, within the scope of the closing operation, for the emergency actuation, the triggering train 9 can be brought into engagement with the ejector lever 15. This is apparent from the sequence of FIG. 3 and FIG. 4 which represent the closing operation. After completing the closing operation, i.e. after the slight resetting of the lock latch 5 from the overtravel position (FIG. 4) into the main locking position (FIG. 5), the ejector lever 15 reaches its ejector position again (FIG. 5).

FIG. 6 now shows the closing operation immediately after an emergency actuation which has been triggered by raising of the first pawl 8. As a result, the triggering train 9, here the emergency actuating arm 18 of the first pawl 8, comes into engagement with the ejector lever 15 and transfers the ejector lever 15 into its ejector position. This adjustment of the ejector lever 15 is associated via the above-discussed interaction between the ejector lever 15 and the coupling lever 12 with a transfer of the coupling lever 12 into its ejector position.

In the exemplary embodiment, the coupling lever 12, such as the control arm 17 of the coupling lever 12, has a cam follower 25. The cam follower 25 may be configured in the manner of a pin which extends parallel to the closing lever axis 20*a*. Furthermore, the cam follower 25 extends through an elongated hole 26 arranged in the closing lever 20, which is associated with a limiting of the pivoting movement of the coupling lever 12. The cam follower 25 is then provided in such a way that, within the scope of the closing operation with an emergency actuation (FIG. 6), the coupling lever 12 slides along the ejector contour 16 via the cam follower 25 and thereby transfers the coupling lever 12 into the ejector position or holds same in the ejector position. The transfer of the coupling lever 12 into the ejector position is therefore associated in FIG. 6 with the fact that the coupling lever 12 is disengaged from the lock latch 5.

As a result of the emergency actuation having been triggered by the raising of the first pawl 8, the pawl assembly 7 also releases the lock latch 5 such that the lock latch 5 pivots into its open position.

It has already been explained further above that different advantageous variants are conceivable for realizing the pawl assembly 7. As an example, the pawl assembly 7 has in addition to the first pawl a second pawl 27 which is in engagement with the lock latch 5 and is blocked by the first pawl 8 at least in the main locking position (FIG. 5). The second pawl 27 is pivotable, in particular raisable, about the pawl axis 27*a*. The second pawl here has a blocking surface 28 in order to come into engagement with a preliminary latch 29 (FIG. 3) and a main latch 30 (FIG. 5) of the lock latch 5. In the exemplary embodiment which is illustrated, the engagement between the second pawl 27 and the lock latch 5 is self-opening only in the main locking position (FIG. 5), and therefore an adjustment of the lock latch 5 from the main locking position in its opening direction, in the counterclockwise direction in FIG. 5, would lead to raising of the second pawl 27, in the counterclockwise direction in FIG. 5, if the first pawl 8 were not to exert any blocking effect on the second pawl 27. For this purpose, the first pawl 8 has a blocking surface 31 which is in blocking engagement in the main locking position with a counter blocking surface 32 of the second pawl 27.

In the pre-locking position, the engagement between the second pawl 27 and the lock latch 5 is self-holding, and therefore the second pawl 27 does not have to be blocked by the first pawl 8.

As discussed above, the opening operation is triggered by raising the first pawl 8. In the main position (FIG. 5), the blocking surface 31 of the first pawl 8 first of all is disengaged from the counter blocking surface 32 of the second pawl 27. Subsequently, a raising contour 33 on the first pawl 8 comes into raising engagement with a counter contour 34 on the second pawl 27. During the opening operation from the main locking position, the engagement between the raising contour 33 and the counter contour 34 is provided only in the event that the second pawl 27 does not automatically pivot in the raising direction, for example due to icing.

For the opening operation from the pre-locking position, an adjustment of the first pawl 8 in the raising direction is in turn provided, as a result of which the raising contour 33 comes into engagement with the counter contour 34, raising the second pawl 27.

It has likewise already been pointed out that the triggering train 9 permits the realization of a motorized opening operation and of a manual opening operation as required.

FIGS. 2 to 6 show that the triggering train 9 has an opening drive 35 which, within the scope of a motorized opening operation, brings about a motorized raising of the first pawl 8. The opening drive 35 acts on an adjustment element 36, the drive contour 37 of which interacts with a counter contour 38 on the first pawl 8 in order to raise the first pawl 8.

Alternatively or additionally, it can be provided that the triggering train 9 has an actuating lever 39 which is mechanically coupled to a manual actuating element, such as a door outside handle or a door inside handle, and therefore, within the scope of a manual opening operation, permits a manual raising of the first pawl 8. Such an actuating lever 39 is indicated by dashed lines in FIGS. 3 to 6.

It should be pointed out that the closing drive 22 and/or the opening drive 35 may be an electric motor drive or electric motor drives. By means of the capability of reducing the actuating forces in the above sense, said electric motor drives can be configured to be comparatively low-powered and therefore cost-effective.

It has likewise already been discussed that, for the emergency actuation, the pawl arrangement 7, such as the first pawl 8, can be brought into engagement with the ejector lever 15. This is advantageous since an additional lever does not have to be provided for the engagement with the ejector lever 5. Furthermore, this may be advantageous since the interaction with the ejector lever 15 is now independent of whether a motorized opening operation or a manual opening operation is to be carried out.

Figure 3:
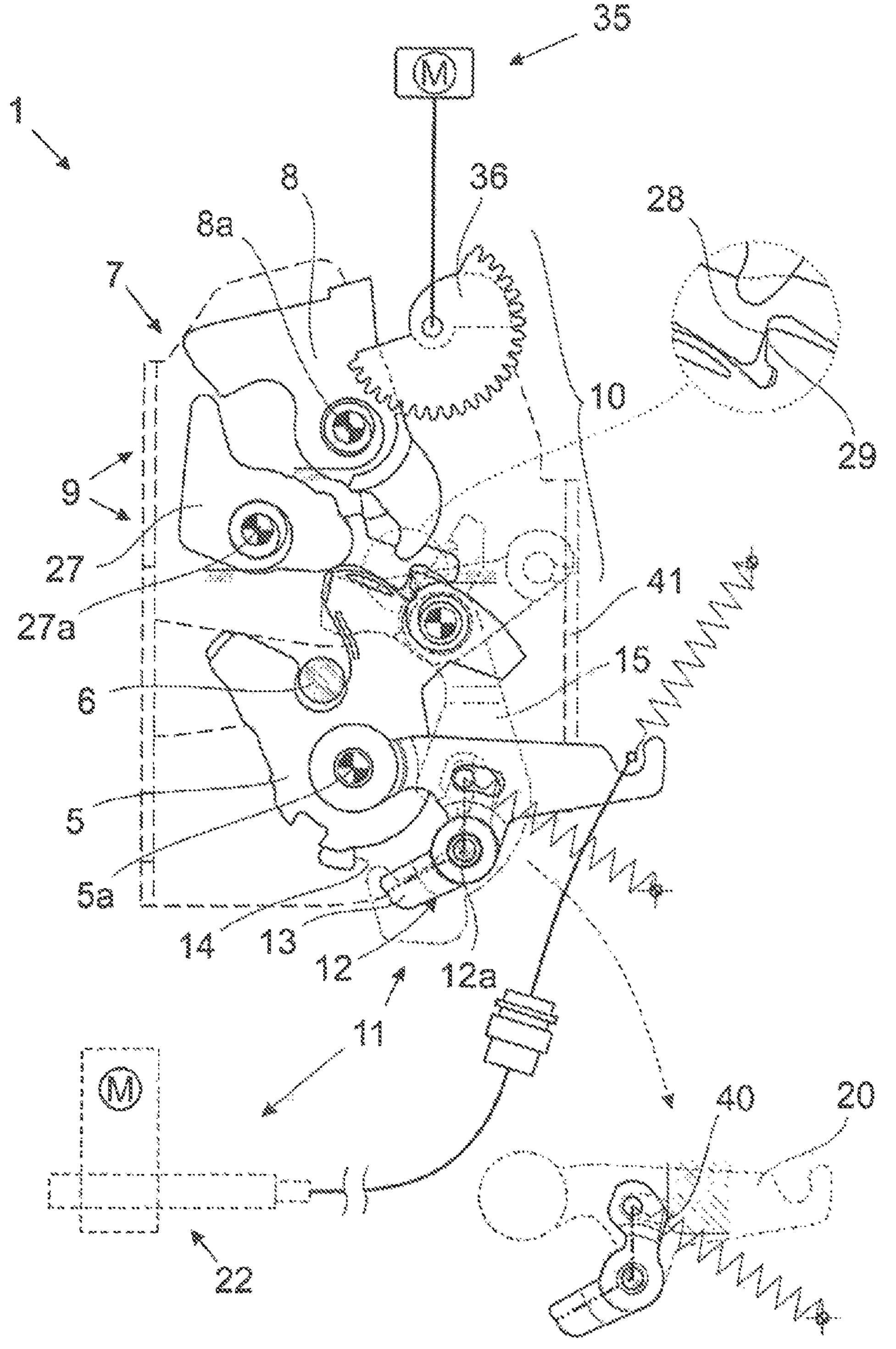
FIG. 3 shows the motor vehicle lock according to FIG. 2 with the lock latch in the pre-locking position at the beginning of the closing operation.
Figure 4:
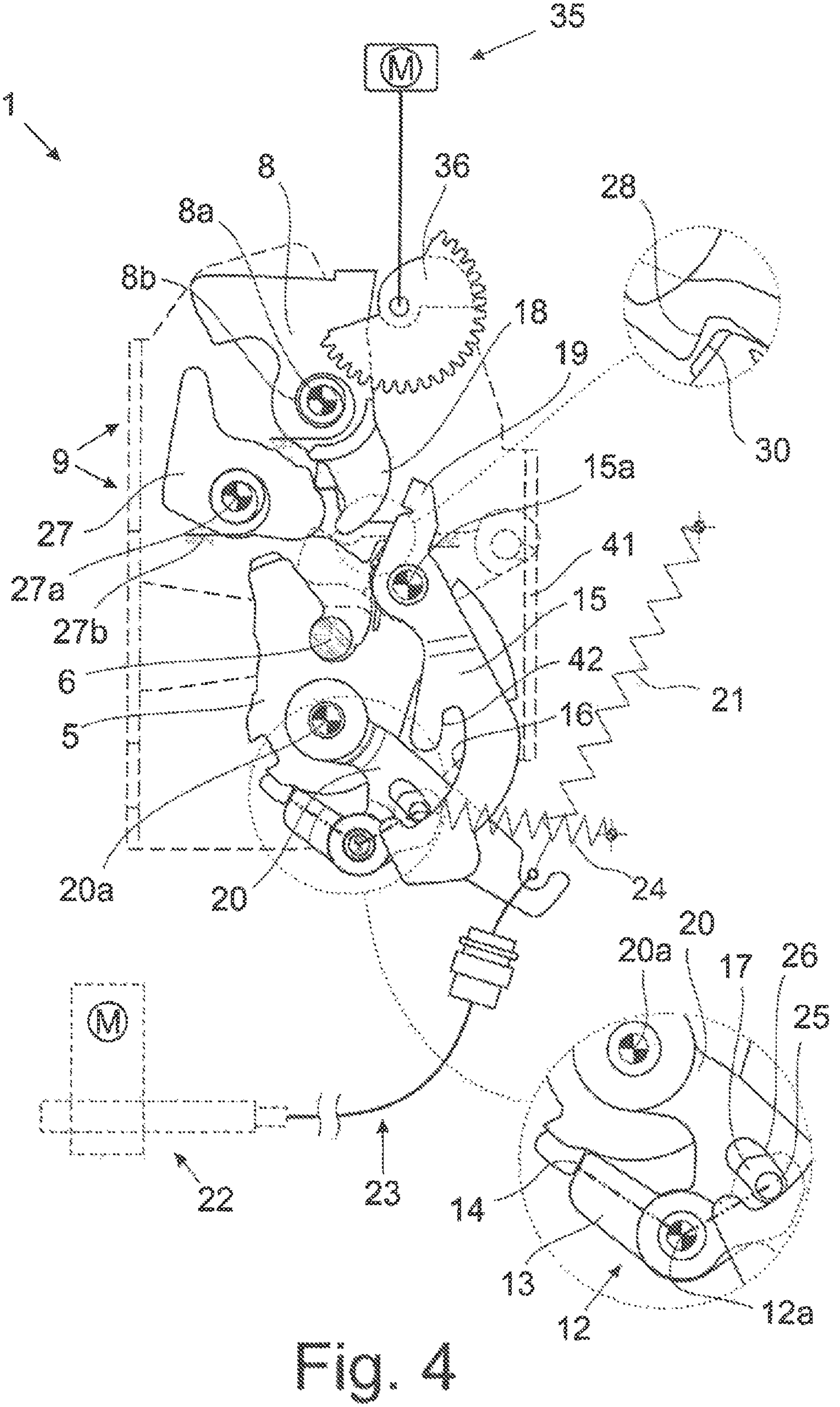
FIG. 4 shows the motor vehicle lock according to FIG. 2 with the lock latch on the other side of the main locking position toward the end of the closing operation.

FIG. 3 shows another significant characteristic of the exemplary embodiment which is illustrated. According thereto, a stationary, resetting contour 40 may be provided with which the coupling lever 12 comes into engagement during resetting of the closing lever 20 into its starting position, as a result of which the coupling lever 12 is adjusted into the ejector position. This inevitable adjustment of the coupling lever 12 is illustrated in FIG. 3. As discussed above, the resetting contour 40 may be configured to be stationary. This may mean that the resetting contour 40 is arranged fixed on the housing with respect to a housing 41 assigned to the motor vehicle lock 1.

In the following, first of all a closing operation without an emergency actuation and then a closing operation with an emergency actuation are explained in detail.

Starting from the pre-locking position illustrated in FIG. 3, the closing drive 22 brings about a closing adjustment of the closing lever 20 from its starting position in the direction of its closing position. The control arm 17 of the coupling lever 12 is disengaged here from the resetting contour 40, and therefore the coupling lever 12 pivots by means of its spring preloading into its coupling position. The ejector lever 15 follows this adjustment of the coupling lever 12 via the ejector contour 16 such that the ejector lever 15 reaches the coupling position counter to its own spring preloading.

The activation arm 19 of the ejector lever 15 is therefore located within the movement range of the emergency actuating arm 18 of the pawl, as can be gathered from the illustration according to FIG. 4. When the overtravel position illustrated in FIG. 4 is reached, the second pawl 27 and the first pawl 8 are already engaged, and therefore switching off of the closing drive 22 leads to a spring-driven resetting of the closing lever 20 into its starting position. For the above engagement of the second pawl 27 and the first pawl 8, the two components are spring-preloaded in the respective engagement direction by corresponding spring arrangements 27*b*, 8*b*.

During the above resetting of the closing lever 20, the control arm 17 of the coupling lever 12 comes in turn into engagement with the resetting contour 40, as a result of which the coupling lever 12, and therefore also the ejector lever 15, via the engagement between the cam follower 25 and an extended cam portion 42 of the ejector lever 15, is transferred in its ejector position.

The situation in which an emergency actuation takes place within the scope of the closing operation is shown in FIG. 6. An emergency actuation has been initiated here, for example when the main locking position is reached, by the first pawl 8 being raised by motor by means of the opening drive 35, as a result of which the emergency actuating arm 18 of the first pawl 8 comes into engagement with the activation arm 19 of the ejector lever 15. The ejector lever 15 is thereby transferred into its ejector position, as a result of which the ejector contour 16 comes into ejecting engagement with the cam follower 25 of the coupling lever 12. Owing to the fact that the raising of the first pawl 8 is also associated with the release of the lock latch 5, the lock latch 5 is now free to pivot into its open position, as shown in FIG. 6.

The above explanation shows that, with the solution according to the proposal, a substantial decoupling between the triggering train 9 and the closing arrangement 11 has been achieved without having an adverse effect on the closing operation, the emergency actuation assigned to the closing operation, or on the opening operation.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS

1 motor vehicle lock
2 motor vehicle
3 side door
4 motor vehicle body
5 lock latch
5 ejector lever
6 locking part
7 pawl assembly
8 first pawl
8 pawl
8 one pawl
9 triggering train
10 triggering assembly
11 closing assembly
12 coupling lever
13 engagement arm
14 engagement contour
15 ejector lever
16 ejector contour
17 control arm
18 emergency actuating arm
19 activation arm
20 closing lever
21 spring assembly
22 closing drive
23 bowden cable
24 spring assembly
25 cam follower
26 hole
27 second pawl
28 blocking surface
29 preliminary latch
30 main latch
31 blocking surface
32 counter blocking surface
33 raising contour
34 counter contour
35 opening drive
36 adjustment element
37 drive contour
38 counter contour
39 actuating lever
40 resetting contour
41 housing
42 cam portion
5*a* lock latch axis
8*a* pawl axis
8*b* corresponding spring arrangements
12*a* coupling lever axis
15*a* ejector lever axis
20*a* axes
20*a* closing lever axis
27*a* pawl axis
27*b* corresponding spring arrangements While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A motor vehicle lock comprising:

a lock latch;

a pawl assembly configured to cooperate with the lock latch and including a first pawl, wherein when the pawl assembly is in a blocking state, the pawl assembly locks the lock latch when the lock latch is in a main locking position and/or a pre-locking position;

a triggering train including the pawl assembly and a triggering assembly, wherein the triggering assembly is configured to actuate the pawl assembly to change the pawl assembly from a locking state during an opening operation; and a closing assembly including a coupling lever configured to pivot to a coupling position, for coupling to the lock latch in order to close the lock latch during a closing operation, wherein the closing assembly is provided with an ejector lever including an ejector contour configured to eject the coupling lever to an ejector position, in which the coupling lever is disengaged from the lock latch, and wherein the triggering train is further configured to move into engagement with the ejector lever during at least portion of the closing operation for ejecting the coupling lever and is disengaged from the ejector lever during at least part of the opening operation.

2. The motor vehicle lock of claim 1, wherein during at least a portion of the closing operation, the triggering train remains disengaged from the ejector lever.

3. The motor vehicle lock of claim 1, wherein the triggering train is configured to be brought into engagement with the ejector lever during at least the portion of the closing operation for ejecting the coupling lever, and is otherwise is disengaged from the ejector lever.

4. The motor vehicle lock of claim 1, wherein the ejector lever is adjustable between an ejector position and a coupling position, and when the ejector lever is adjusted between the ejector position and the coupling position, the ejector lever interacts with the coupling lever to adjust the coupling lever between a coupling-lever ejector position and a coupling-lever coupling position.

5. The motor vehicle lock of claim 1, wherein the closing assembly includes a closing lever and the coupling lever is pivotably mounted to the closing lever, and wherein the closing operation includes a closing adjustment of the closing lever from a starting position.

6. The motor vehicle lock of claim 1, wherein the coupling lever is spring-preloaded into a coupling-lever coupling position, and/or the ejector lever is spring-preloaded to an ejector position.

7. The motor vehicle lock of claim 1, wherein during the closing operation, the ejector lever is adjusted from the ejector position, in which the ejector lever is outside a movement range of the triggering train to a coupling position, in which the ejector lever is within the movement range of the triggering train, so that during the closing operation, the triggering train is configured to move into engagement with the ejector lever.

8. The motor vehicle lock of claim 7, wherein the ejector lever moves to the ejector position after completing the closing operation.

9. The motor vehicle lock of claim 1, wherein during the closing operation, the triggering train transfers the ejector lever to the ejector position and transfers the coupling lever to the ejector position.

10. The motor vehicle lock of claim 1, wherein the coupling lever includes a cam follower, and during the closing operation the cam follower slides along the ejector contour so that the cam follower transfers the coupling lever to the ejector position or holds the coupling lever in the ejector position.

11. The motor vehicle lock of claim 1, wherein the pawl assembly includes a second pawl configured to engage the lock latch and wherein when the pawl assembly is in the blocking state, the second pawl is blocked by the first pawl.

12. The motor vehicle lock of claim 1, wherein the triggering train includes an opening drive, wherein during a motorized opening operation of the opening drive, the opening drive raises the pawl.

13. The motor vehicle lock of claim 12, wherein the triggering train includes an actuating lever, wherein during a manual opening operation, the actuating lever permits a manual raising of the pawl.

14. The motor vehicle lock of claim 1, wherein the pawl assembly is configured to move into engagement with the ejector lever.

15. The motor vehicle lock of claim 1, further comprising:

a resetting contour, wherein the coupling lever is configured to engage the resetting contour as the coupling lever is adjusted to a starting position to transfer the coupling lever to the ejector position.

16. The motor vehicle lock of claim 1, wherein the triggering assembly is configured to raise the pawl to change the pawl assembly from the locking state.

17. A motor vehicle lock comprising:

a lock latch;

a pawl assembly configured to cooperate with the lock latch and change between a blocking state, in which the pawl assembly locks the lock latch;

a triggering assembly configured to actuate the pawl assembly to change the pawl assembly from a locking state during an opening operation of the motor vehicle lock; and a closing assembly including an ejector lever and a coupling lever configured to pivot to a coupling position, in which the coupling lever is coupled to the lock latch to close the lock latch during a closing operation, wherein the triggering assembly is further configured to disengage the ejector lever during at least a portion of the opening operation.

* * * * *